United States Patent [19]

Huebschen et al.

[11] Patent Number: 5,246,286
[45] Date of Patent: Sep. 21, 1993

[54] ADHESIVELY BONDED TOOL CABINET AND METHOD OF ASSEMBLY THEREOF

[75] Inventors: David A. Huebschen; Glenn A. Kaufman; Gerald P. McGlinn, all of Kenosha, Wis.; Robert L. Schmale, Clear Lake, Iowa; Dean A. Hoskins; Walter K. Krahenbuhl, both of Algona, Iowa; Gary J. Erdman, Whittemore, Iowa; Robert J. Blair, Chillicothe, Mo.; Theodore J. Caron, Kenosha, Wis.

[73] Assignee: Snap-on Tools Corporation, Kenosha, Wis.

[21] Appl. No.: 978,029

[22] Filed: Nov. 18, 1992

Related U.S. Application Data

[63] Continuation of Ser. No. 680,241, Apr. 3, 1991, abandoned.

[51] Int. Cl.⁵ .............................................. A47B 55/00
[52] U.S. Cl. ................................... 312/263; 312/249.8
[58] Field of Search ............ 312/249.8, 249.9, 249.11, 312/263, 264, 257.1; 226/646, 648, 654

[56] References Cited

U.S. PATENT DOCUMENTS

| | | |
|---|---|---|
| 3,012,689 | 12/1961 | Harris . |
| 3,125,056 | 3/1964 | Kaiser . |
| 3,519,321 | 7/1970 | Schreyer . |
| 3,561,633 | 2/1971 | Morrison et al. . |
| 3,817,589 | 6/1974 | Anderson . |
| 4,065,023 | 12/1977 | Rentmeester et al. . |
| 4,288,130 | 9/1981 | Baldwin .................... 312/265.1 X |
| 4,288,132 | 9/1981 | Znamirowski et al. ......... 312/265.5 |
| 4,303,286 | 12/1981 | McClellan . |
| 4,372,459 | 2/1983 | Newman . |
| 4,834,257 | 5/1989 | Book et al. .................... 220/646 |
| 4,968,844 | 9/1988 | Ludwig .......................... 312/221 |

FOREIGN PATENT DOCUMENTS 2386965 11/1978 France .

OTHER PUBLICATIONS

Mid Continent Lumber Dealers flyer, dated Jun. 15, 1987.
Craftsman Roll-A-Way Cabinet (2 drawings).
Magnum Roll-A-Way Cabinet (2 drawings).
Snap-on Tools Corp. KB02991 Cabinet (5 drawings).

*Primary Examiner*—Peter R. Brown
*Attorney, Agent, or Firm*—Emrich & Dithmar

[57] ABSTRACT

A tool cabinet is formed without the use of fasteners or weldments by providing back and side panel sections in an integral unit having top and bottom flanges, and separate top and bottom panel sections having attachment flanges adapted to be interfitted with the flanges on the back and side panel unit to form an open-front housing. Three continuous loop frame members are spaced apart front-to-back inside the housing and are adhesively secured to the top, bottom and side panel sections and support drawer assemblies mounted in a front opening. A lock bar guide is adhesively secured to the back panel section and receives a lock bar which is inserted through a notch in the bottom panel section after the housing has been assembled. Adhesive or frictional interengagement may also be used to secure together the flanges of the panel sections. An internal framework comprising a single, wide loop frame member with spaced-apart ribs is also disclosed.

24 Claims, 4 Drawing Sheets

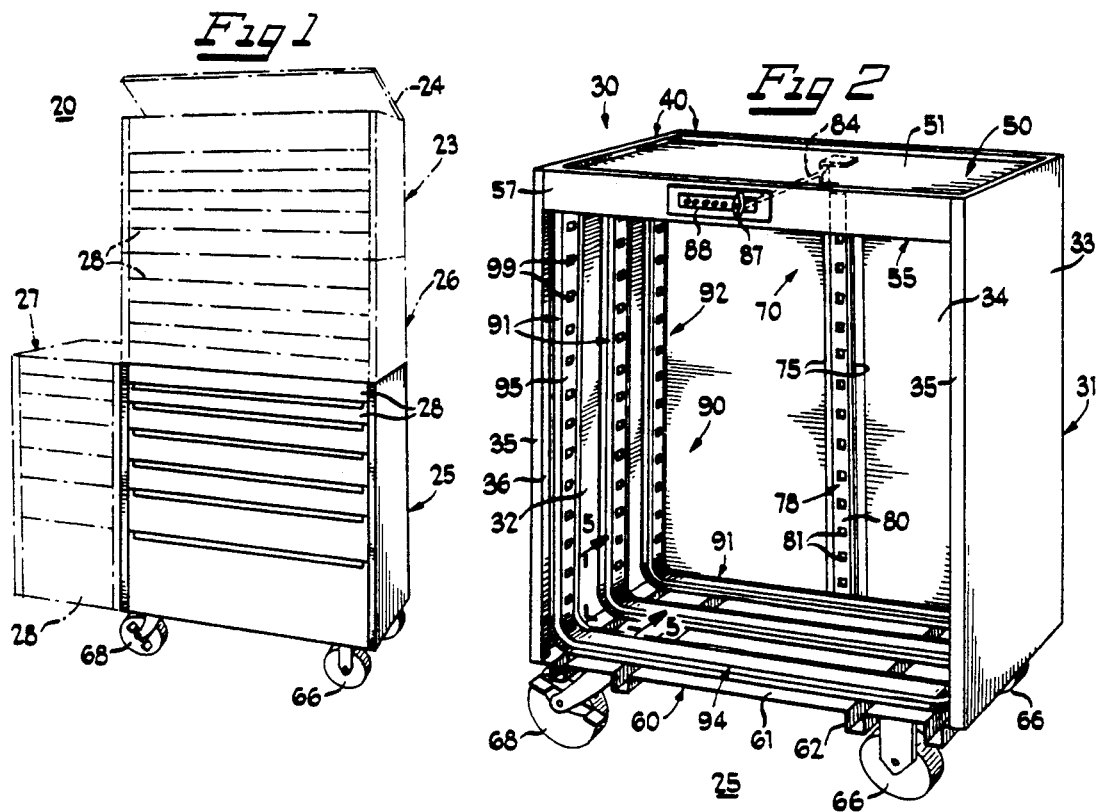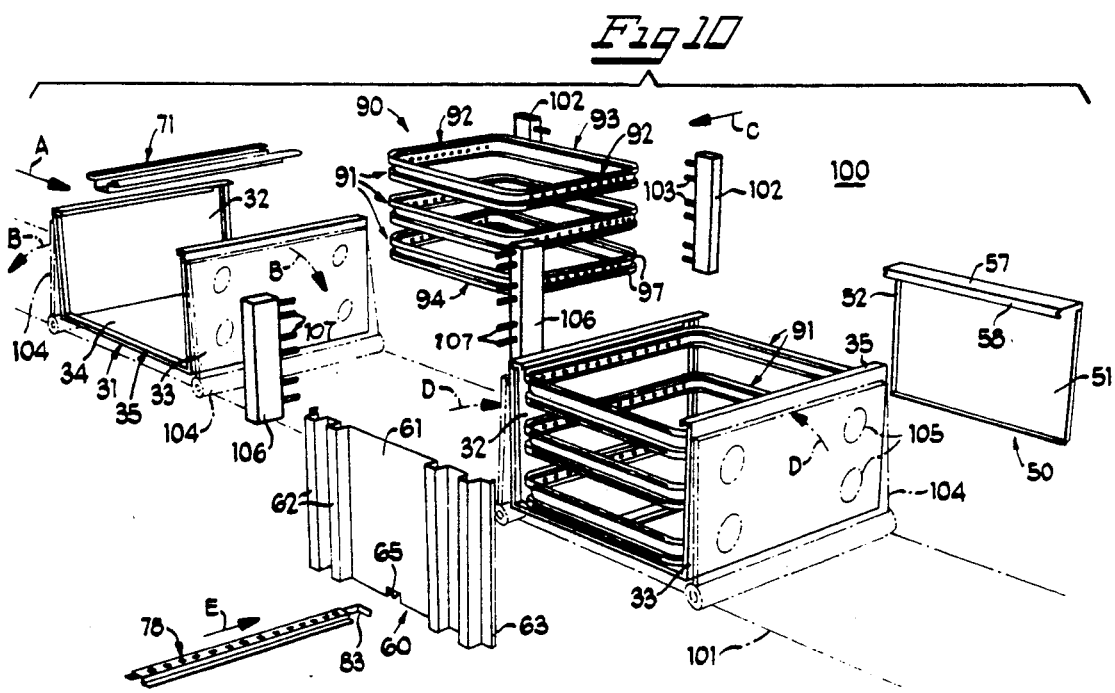

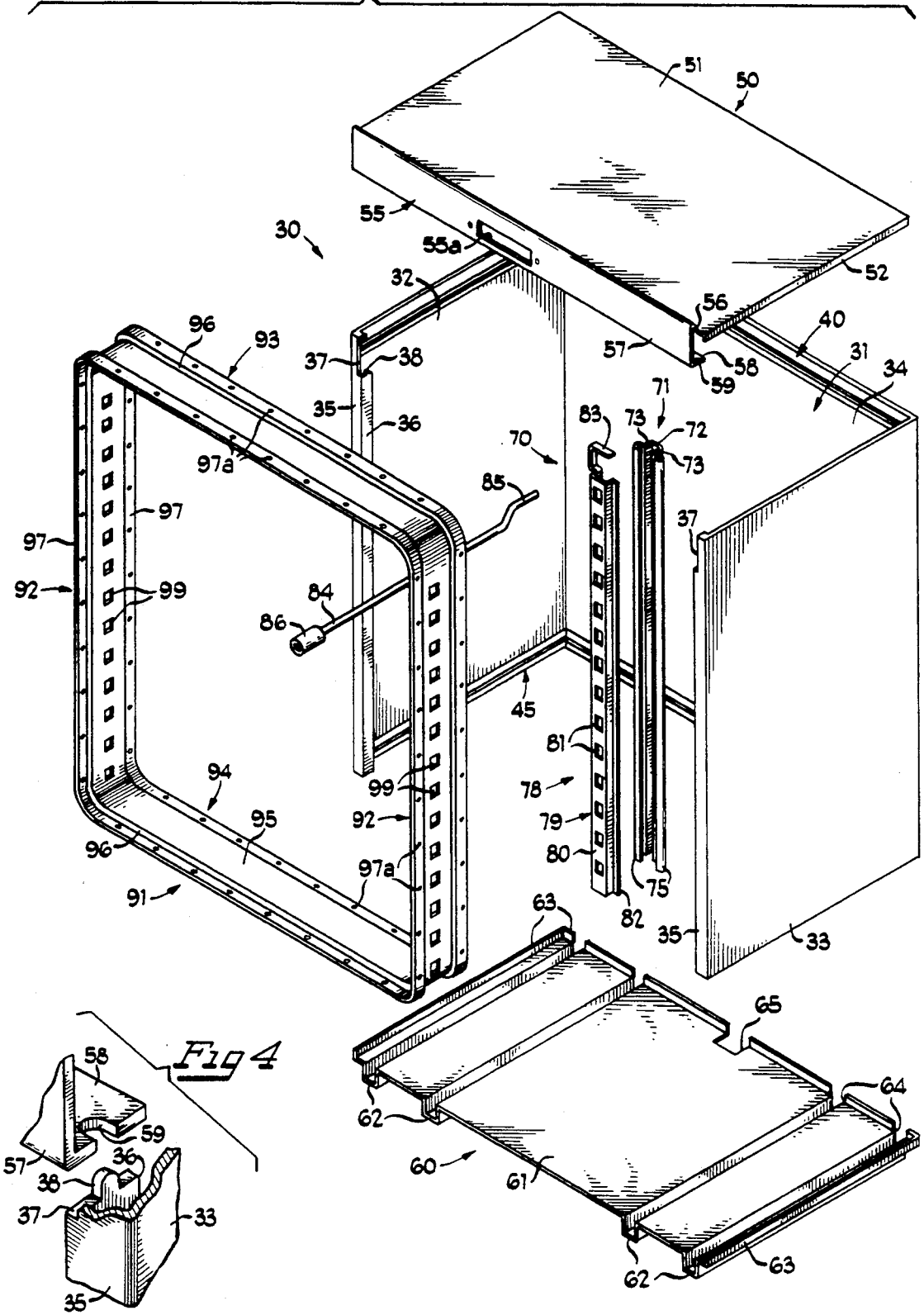

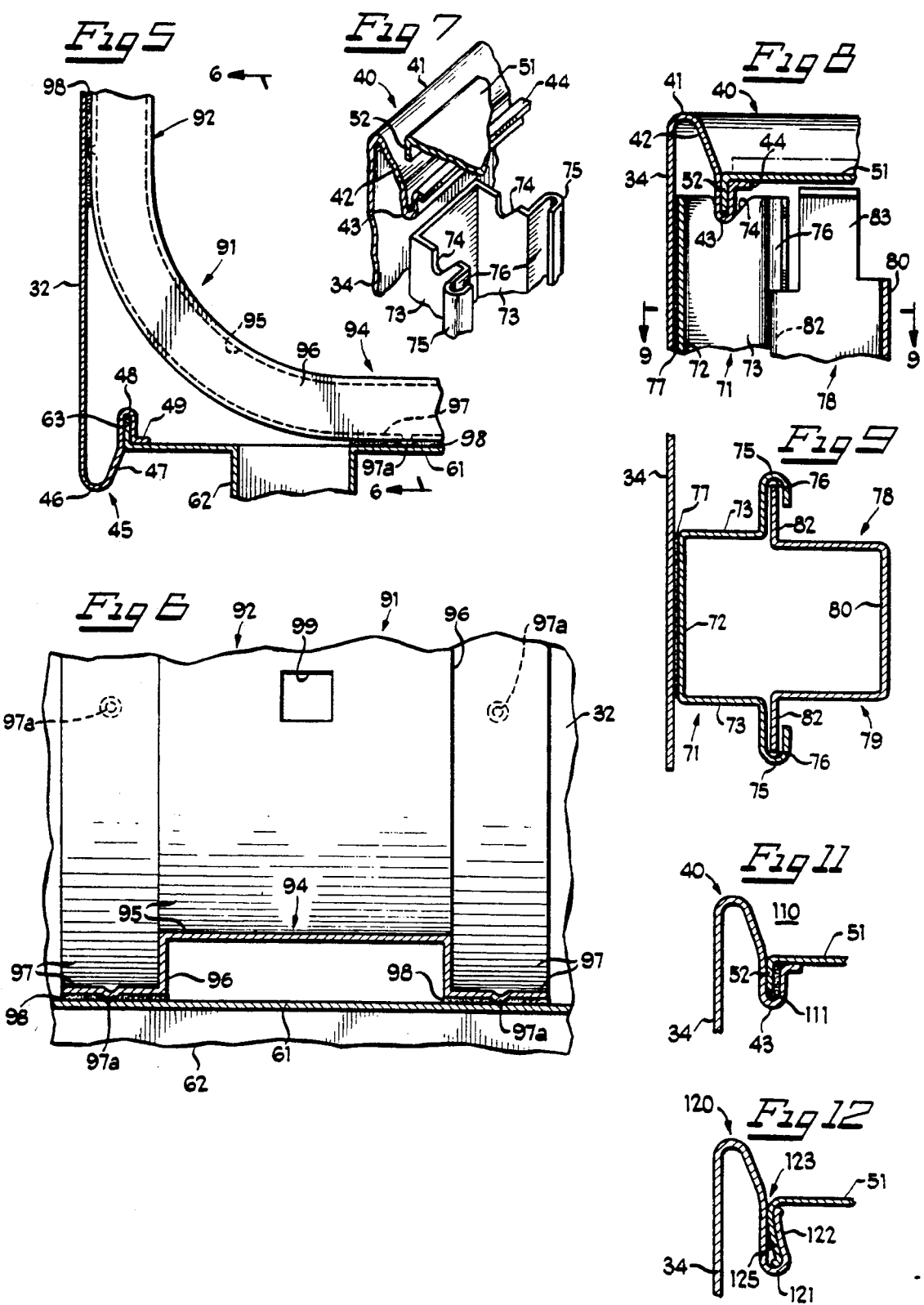

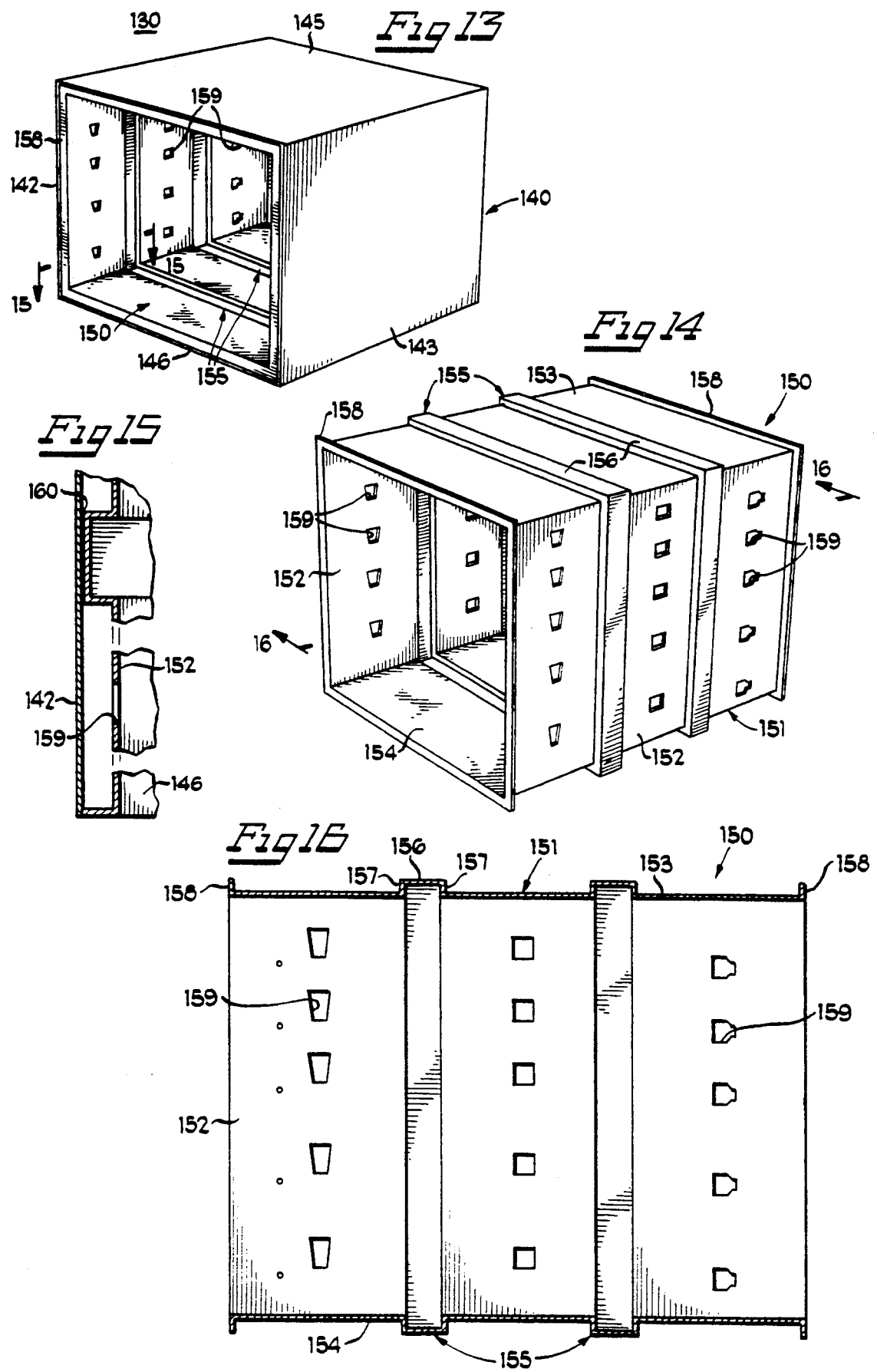

ADHESIVELY BONDED TOOL CABINET AND METHOD OF ASSEMBLY THEREOF

This is a continuation of application Ser. No. 07/680,241, filed Apr. 3, 1991 abandoned.

BACKGROUND OF THE INVENTION

1. Field of the Invention

The present invention relates to metal tool cabinet construction and to methods for assembling same.

2. Description of the Prior Art

Prior tool cabinets have been provided in a number of shapes and sizes, and have also been provided in the form of various modules which can be joined together to form a composite tool cabinet. Typically, such tool cabinets or tool cabinet modules have been formed of a series of metal panel sections connected to form an exterior housing. Additional panels or false sides were mounted within this exterior housing so as to provide a front opening in which a plurality of sliding drawers may be mounted. The exterior housing is formed of a number of parts interconnected together, as by welding, and then the internal panel sections are secured to the housing, as by welding, either alone or in combination with adhesive bonding.

Such prior art tool cabinets have suffered from a number of disadvantages. First of all, the combination exterior housing and interior panels is of relatively complex construction and requires the assembly of plural parts. Also, the welded interconnection of the parts of the tool cabinet is a time-consuming and expensive operation. Furthermore, many of the weldments are visible from the outside of the cabinet and detract from the appearance of the cabinet. Also, the construction procedure of mounting the interior panels subsequent to forming the exterior housing results in dimensional inaccuracies which may cause drawer binding and misalignments.

SUMMARY OF THE INVENTION

It is a general object of the present invention to provide an improved cabinet structure and method of forming same which avoid the disadvantages of prior constructions and methods while affording additional structural and operating advantages.

An important feature of the invention is the provision of a cabinet structure which is of relatively simple and economical construction.

In connection with the foregoing feature, another feature of the invention is the provision of a cabinet structure which utilizes a minimal number of parts.

Still another feature of the invention is the provision of a cabinet structure of the type set forth in which the parts are interconnected without the use of fasteners or welding.

Another feature of the invention is the provision of a cabinet structure of the type set forth which affords increased strength, dimensional accuracy and improved appearance.

Yet another feature of the invention is the provision of a method of forming a cabinet structure of the type set forth which lends itself to automation.

Certain ones of these and other features of the invention are attained by providing a cabinet structure comprising: a plurality of interconnected panel sections arranged to form a housing, a continuous loop frame member disposed internally of the housing, and means fixedly securing the loop frame member to the housing.

Others of these features are attained by providing a method of forming a cabinet structure comprising the steps of: providing a continuous loop frame member and a plurality of panel sections, interconnecting the panel sections to form a housing, and fixedly securing the housing to the outside of the loop frame member.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there are illustrated in the accompanying drawings preferred embodiments thereof, from an inspection of which, when considered in connection with the following description, the invention, its construction and operation, and many of its advantages should be readily understood and appreciated.

FIG. 1 is a front perspective view, partially in phantom, of a composite tool cabinet including a number of cabinet modules, constructed in accordance with a first embodiment of the present invention;

FIG. 2 is an enlarged, front perspective view of one of the tool cabinet modules of FIG. 1, with the drawer assemblies removed;

FIG. 3 is a further enlarged, exploded, perspective view of the cabinet module of FIG. 2, with the exception of the caster assemblies;

FIG. 4 is a further enlarged, fragmentary, perspective view illustrating the cooperation between portions of the top and side panel sections of the module of FIG. 2;

FIG. 5 is an enlarged, fragmentary view in vertical section of the lower left-hand corner of the cabinet module of FIG. 2, taken generally along the line 5—5 therein;

FIG. 6 is a fragmentary, sectional view taken generally along the line 6—6 in FIG. 5;

FIG. 7 is a fragmentary, exploded, perspective view illustrating the cooperation of the lock bar guide with the top and rear panel sections of the cabinet module of FIG. 2;

FIG. 8 is a fragmentary view in vertical section illustrating the parts of FIG. 7 in their assembled condition, along with the lock bar;

FIG. 9 is a fragmentary view in horizontal section taken along the line 9—9 in FIG. 8;

FIG. 10 is a perspective view, partially diagrammatic, illustrating a method and apparatus for assembling the cabinet module of FIG. 2;

FIG. 11 is a fragmentary, sectional view, similar to FIG. 8, illustrating a modified form of attachment flange interconnection;

FIG. 12 is a view similar to FIG. 11, illustrating another modification of the attachment flange interconnection;

FIG. 13 is a front perspective view of a cabinet structure constructed in accordance with a second embodiment of the invention;

FIG. 14 a slightly enlarged perspective view of the framework of the cabinet structure of FIG. 13;

FIG. 15 is a further enlarged fragmentary view in horizontal section, taken along the line 15—15 in FIG.

13, and rotated approximately 90° counterclockwise; and

FIG. 16 is a further enlarged view in horizontal section taken along the line 16—16 in FIG. 14.

DESCRIPTION OF THE PREFERRED EMBODIMENTS

Referring to FIG. 1, there is illustrated a composite tool cabinet comprised of a plurality of different cabinet modules. More specifically, the cabinet 20 includes a roll cabinet module 25 on which is mounted a drawer unit module 26, on which, in turn, is mounted a top chest module 23 having a hinged lid 24. An end unit module 27 may be mounted on either end of the roll cabinet module 25. Each of the modules 23 and 25–27 includes a plurality of front-opening slidable drawer assemblies 28 of various sizes.

Each of the cabinet modules includes a plurality of interconnected panels defining a housing in which the drawer assemblies 28 are mounted. Heretofore, such modules have been manufactured by assembling a multi-part framework, as by welding, and assembling the panels on the framework by welding or the like. The present invention relates to a unique construction of such cabinet modules and a method of assembling same. While, for purposes of illustration, the present invention will be described in connection with the construction of the roll cabinet module 25, it will be appreciated that the principles of the present invention are equally applicable to any of the other cabinet modules 23, 26 and 27 as well as other types of cabinet structures.

Referring now to FIGS. 2–4, the roll cabinet module 25 includes a housing 30 comprised of a plurality of interconnected panel sections and attached to a framework 90. The housing 30 includes a side/back panel unit 31 of one-piece construction including rectangular side panel sections 32 and 33 interconnected at the rear ends thereof by a rectangular back panel section 34. Each of the side panel sections 32 and 33 is provided at its front edge with a laterally inwardly extending front flange 35 extending the entire length thereof, each flange 35 being provided at its inner edge with a rearwardly extending lip 36. Rectangular recesses 37 are formed in the upper ends of the front flanges 35 and the lips 36 thereof, each of the lips 36 being provided with an upstanding tab 38.

The side/back panel unit 31 is provided at the upper and lower edges thereof, respectively, with an upper attachment flange 40 and a lower attachment flange 45 which extend along the entire length of each of the panel sections 32–34. Referring also to FIGS. 7 and 8, the upper attachment flange 40 has a rounded top 41, and an inclined portion 42 which slopes downwardly and inwardly from the top 41 and terminates in a generally U-shaped trough 43 which is provided at its distal end with a laterally inwardly extending horizontal lip 44. Referring also to FIG. 5, the lower attachment flange 45 has a similar shape, being provided with a rounded bottom 46, an inclined portion 47 which slopes upwardly and inwardly from the bottom 46 and terminates at its upper end in an inverted U-shaped trough 48 which is provided at its distal end with a laterally inwardly extending horizontal lip 49.

The housing 30 also includes a top panel section 50 which has a flat, rectangular top wall 51 provided along its side and rear edges with a vertically depending rectangular attachment flange 52. The wall 51 is provided at its front edge with a front flange 55 which terminates just short of the side edges of the wall 51. More specifically, the front flange 55 includes an upwardly and forwardly inclined portion 56 which is unitary with the front edge of the wall 51, a vertical portion 57 which depends from the upper end of the inclined portion 56 and a bottom lip 58 which extends rearwardly from the lower edge of the vertical portion 57. Notches 59 are respectively formed in the opposite ends of the bottom lip 58 (one shown—see FIG. 4).

The housing 30 also includes a bottom panel section 60 which includes a generally rectangular wall 61 provided with a plurality of depending channels 62, each of which is substantially rectangular in transverse cross section. Preferably, the channels 62 are four in number, arranged in two pairs respectively disposed adjacent to the opposite ends of the bottom wall 61, the channels 62 serving to add rigidity to the bottom panel section 60 and serving as feet to facilitate stacking of the cabinet module. The bottom panel section 60 is provided with an upstanding attachment flange 63 which extends along the length of the side and rear edges of the wall 61, the flange 63 being provided with notches 64 therein aligned with the rear ends of the channels 62. Also formed in the attachment flange 63 and extending into the rear edge of the wall 61 centrally thereof is a large center notch 65 for a purpose to be explained below.

In assembly, the attachment flange 52 of the top panel section 50 fits into the trough 43 of the upper attachment flange 40 on the side/back panel unit 31, as is best illustrated in FIGS. 7 and 8, while the attachment flange 63 of the bottom panel section 60 fits into the trough 48 of the lower attachment flange 45 of the side/back panel unit 31, as is best illustrated in FIG. 5, to form the housing 30. It will be appreciated that, when the top panel section 50 is thus mounted in place, the opposite ends of the front flange 55 thereof fit respectively into the recesses 37 in the front flanges 35 of the side/back panel unit 31, with the notches 59 respectively receiving the tabs 38 (see FIG. 4). The housing 30 is also provided with a pair of fixed caster assemblies 66 which may be mounted to the bottom wall 61 between the channels 62 of one pair thereof, and a pair of swivel caster assemblies 68 which may be mounted to the bottom wall 61 between the channels 62 of the other pair thereof, as is illustrated in FIG. 2.

The housing 30 also includes a lock assembly, generally designated by the numeral 70, which includes a lock bar guide 71 adapted to be secured to the back panel section 34 centrally thereof. Referring in particular to FIGS. 3 and 7–9, the lock bar guide 71 is an elongated member having a generally channel-shaped body comprising a rear wall 72 and a pair of forwardly extending side walls 73, each of the side walls 73 being provided at the upper and lower ends thereof with notches 74, the upper end ones of which are illustrated in FIGS. 7 and 8. Respectively integral with the distal ends of the side walls 73 and extending laterally outwardly therefrom are recurved flanges 75 which are generally U-shaped in transverse cross section so as to define elongated vertically extending troughs 76. The notches 74 are respectively shaped and dimensioned to receive the troughs 43 and 48 of the upper and lower attachment flanges 40 and 45 of the back panel section 34 (see FIG. 8), the length of the lock bar guide 71 being such that it can be snap-fitted into place along the back panel section 34 centrally thereof in vertical alignment with the central notch 65 in the bottom panel section 60. Preferably, the rear wall 72 of the lock bar guide 71 is secured to the back panel section 34 by a suitable adhesive 77 (see FIGS. 8 and 9).

The lock assembly 70 also includes a lock bar 78 which is generally hat-shaped in transverse cross section, including a channel 79 having a rectangular front wall 80 provided with a plurality of longitudinally spaced-apart rectangular openings 81 therein. The legs of the channel 79 are respectively provided at their distal ends with laterally outwardly extending rectangular slide flanges 82, which are adapted to be respectively slidably received in the troughs 76 of the lock bar guide 71 for vertical sliding movement with respect thereto, as can best be seen in FIGS. 8 and 9. Integral with one leg of the channel 79 at the upper end thereof is an upstanding, generally L-shaped finger 83. The lock assembly 70 also includes an elongated lock rod 84 having an offset inner end 85 (FIG. 3) and provided at its forward end with a bushing 86 which is adapted to be received through a complementary opening 55a in the front flange 55 of the top panel section 50 for receiving an associated handle 87 (FIG. 2) to rotate the lock rod 84. A combination push-button lock mechanism 88 may be provided on the front flange 55 to selectively permit or prevent rotation of the handle 87. The offset inner end 85 of the lock rod 84 is disposed for engagement with the finger 83 of the lock bar 78 for effecting vertical movement thereof with respect to the lock bar guide 71 in response to rotation of the handle 87 for moving the openings 81 of the lock bar 78 between locking and unlocking positions with respect to the associated drawer assemblies 28 in a known manner.

The framework 90 comprises a plurality of identical loop frame members 91, three of which are provided in the illustrated embodiment. The loop frame members 91 are disposed within the housing 30 and are equidistantly spaced apart front-to-back with respect thereto. Referring also to FIGS. 5 and 6, each of the loop frame members 91 defines a continuous, substantially rectangular loop including a pair of opposed upstanding side portions 92, a horizontal top portion 93 and a horizontal bottom portion 94. Each loop frame member 91 is generally hat-shaped in transverse cross section along its entire length, including a rectangular center wall 95 provided at its lateral side edges with side flanges 96 which project outwardly from the center wall 95 substantially perpendicular thereto. Each of the side flanges 96 is provided at its distal end with an attachment flange 97 which projects outwardly therefrom substantially perpendicular thereto and parallel to the center wall 95. Each of the flanges 97 is preferably provided with a plurality of outwardly projecting bosses or dimples 97a which are spaced apart longitudinally of the flat portions 92-94 of the loop frame members 91 (see FIG. 3). Alternatively, each of the flanges 97 may have a continuous outwardly projecting rib (not shown) extending longitudinally around the entire perimeter of the flange 97. If desired, two such ribs, laterally spaced apart, could be provided on each flange 97.

The loop frame members 91 are dimensioned so that, in use, the attachment flanges 97 thereof are engageable with the side panel sections 32 and 33 along the side portions 92 of the loop frame members 91. The attachment flanges 97 are also engageable with the top wall 51 and the bottom wall 61 along the top and bottom portions 93 and 94, respectively, of the loop frame member 91. The attachment flanges 97 are preferably fixedly secured to the associated panel sections by a suitable adhesive 98 (see FIGS. 5 and 6). The dimples 97a (or ribs) serve as stops to establish a minimum spacing between the attachment flanges 97 and the associated panel sections so as to prevent the adhesive 98 from being completely squeezed out from therebetween. Since the adhesive 98 is typically an electrically insulating material, the dimples 97a (or ribs) also serve to establish electrical contact between the loop frame members 91 and the associated panel sections to facilitate the use of electrostatic spray systems for painting the cabinet module. The center wall 95 of each loop frame member 91 is provided along the side portions 92 thereof with a plurality of equidistantly spaced-apart rectangular openings 99 for use in mounting the drawer assemblies 28, in a known manner. It will be appreciated that the loop frame members 91 serve to rigidly hold the side/back panel unit 31, the top panel section 50 and the bottom panel section 60 in an assembled condition with one another. It also serves to provide rigidity for the housing 30.

Referring now FIG. 10, there is illustrated a method and apparatus for assembling the housing 3 and the framework 90 of the roll cabinet module 25. It is a fundamental aspect of the present invention that this assembly operation can be performed without the use of fasteners and without the need for welding, thereby greatly simplifying, speeding and reducing the cost of the assembly operation. The side/back panel unit 31 is fed into an assembly station on a suitable conveyor 101, the panel unit 31 being oriented with the back panel section 34 down and with the side panel sections 32 and 33 projecting upwardly and spaced apart in the direction of conveyor travel, designated by the arrow A. At a first station the lock bar guide 71 is attached to the back panel section 34. For this purpose, a strip 77 of adhesive material (see FIG. 8) may be applied to the rear wall 72 of the lock bar guide 71 and/or to the back panel section 34, and the lock bar guide 71 is then moved by a suitable apparatus (not shown) into position on the back panel section 34.

The side/back panel unit 31 may be disposed between a pair of spreader fixtures 104 carried by the conveyor 101, the spreader fixtures 104 being respectively engageable with the outer surfaces of the side panel sections 32 and 33, as by suction units 105, and being pivotally movable for deflecting the side panel sections 32 and 33 laterally outwardly, as indicated by the arrows B, tilting them outwardly and spreading them apart at a frame assembly station. The loop frame members 91 are carried in vertically spaced-apart relationship by a suitable fixture (not shown) which moves them horizontally in the direction of the arrow C between a pair of adhesive dispensers 102, each carrying six nozzles 103 for respectively applying beads of adhesive material 98 (see FIG. 6) to the outer surfaces of the attachment flanges 97 along the side portions 92 of the loop frame members 91. The fixture then continues to carry the spaced-apart loop frame members 91 to an assembly position between the spread-apart side panel sections 32 and 33. The spreader fixtures 104 are then operated to deflect the side panel sections 32 and 33 back inwardly in the directions indicated by the arrows D, for urging them firmly against the adhesive-bearing side portions 92 of the loop frame members 91.

The fixture carrying the loop frame members 91 is then released and the side/back panel unit 31 is carried by the conveyor unit 101 between another pair of adhesive dispensers 106, the nozzles 107 of which respectively dispense strips of adhesive 98 onto the outer surfaces of the attachment flanges 97 on the top and bottom portions 93 and 94 of the loop frame members 91. The top and bottom panel sections 50 and 60, while vertically oriented as illustrated in FIG. 10, are moved by suitable fixtures (not shown) into engagement with the adhesive-bearing attachment flanges 97 of the top and bottom portions 93 and 94 of the loop frame members 91, the attachment flanges 52 and 63 being moved into position into the troughs 43 and 48 of the upper and lower attachment flanges 40 and 45 of the side/back panel unit 31. The top and bottom panel sections 50 and 60 may be held in this assembled condition by the associated fixtures until the adhesive has set.

Alternatively, in assembling the housing 30 with the framework 90, the loop frame members 91 may be held by a suitable fixture in their erect, spaced-apart positions and adhesive may be applied to the outer surfaces of the attachment flanges 97 of the side portions 92 by robot arms or the like. Then, the side/back panel unit 31 may be fitted, in its normal upstanding position, around the array of loop frame members 91 and held in contact therewith by suitable clamping fixtures until the adhesive is set. Then, the assembly may be moved to another station where adhesive beads may be applied, by robot arms or the like, to the top portions 93 of the loop frame members 91, and then the top panel section 50 may be applied thereto by a suitable fixture and held in place until the adhesive is set. Then the unit may be inverted and the bottom panel section 60 may be adhesively secured to the bottom portions 94 of the loop frame members 91 in the same manner.

The lock bar 78 is then fed by a suitable fixture (not shown), finger-end first, through the center notch 65 in the bottom panel section 60 in the direction indicated by the arrow E, for moving the slide flanges 82 slidably into the troughs 76 of the lock bar guides 71. The lock rod 84 and the combination assembly 88 may then be assembled in place in standard fashion, and the caster assemblies 66 and 68 may be mounted to the bottom panel section 60 by any suitable means. The assembly of the housing 30 is now complete and the roll cabinet module is conditioned for receiving the drawer assemblies 28.

While, in the embodiment illustrated in FIGS. 2-9, the panel sections are held together solely by the framework 90, they may also be held together by the interfitting attachment flanges thereof. Thus, referring to FIG. 11, there is illustrated an alternative form 110 of attachment flange assembly, wherein the trough 43 of the upper attachment flange 40 (as well as the trough 48 of the lower attachment flange 45) may be filled with a suitable adhesive 111. Thus, during assembly, the attachment flange 52 of the top panel section 50 (and the attachment flange 63 of the bottom panel section 60) are embedded in the adhesive 111, which sets to form a firm interconnection.

Alternatively, referring to FIG. 12, there is illustrated another form of attachment flange assembly, wherein the side/back panel unit 31 carries a modified attachment flange 120 which is substantially the same as the attachment flange 40 except that it is provided with a trough 121, the outer wall 122 of which is recurved in a generally shallow S-shaped configuration. Thus, it will be appreciated that the distal end of the front wall 122 is closer to the opposed wall of the flange than is the trough-end thereof for defining a narrow gap 123. The top panel section 50 has a modified attachment flange 125 thereon which has a complementary recurved S-shaped configuration. The attachment flange 125 is so dimensioned is that it has an overall width slightly greater than the width of the gap 123, providing a frictional or interference fit between the attachment flanges 120 and 125. After the attachment flange 125 is snap-fitted into the trough 121, it will mate with the inner surface of the recurved front wall 122 of the attachment flange 120. While only the flange interconnection at the top of the housing 30 is illustrated in FIG. 12, it will be appreciated that the same arrangement is used for interconnecting the bottom panel section 60 with the lower attachment flange of the side/back panel unit 31.

Referring now to FIGS. 13-16, there is illustrated a tool cabinet 130 which includes a housing 140 mounted on an internal framework 150, constructed in accordance with a second embodiment of the present invention. The housing 140 includes opposed side panel sections 142 and 143, a top panel section 145, a bottom panel section 146 and a rear panel section (not shown) all interconnected in a suitable manner to form an open-front box-like housing. If desired, the panel sections 142-146 may be provided with interfitting flange arrangements of the type described above in connection with FIGS. 1-12.

The framework 150 comprises a loop frame member 151 disposed within the housing 140 and having a front-to-back depth which is substantially equal to that of the housing 140. The loop frame member 151 defines a continuous, substantially rectangular loop including a pair of opposed upstanding side portions 152, a horizontal top portion 153 and a horizontal bottom portion 154, each of the portions 152-154 being generally rectangular in overall shape. The loop frame member 151 includes a pair of outwardly projecting ribs 155 which extend around the entire perimeter of the loop frame member 151 substantially parallel to the front and rear edges thereof and spaced apart with respect thereto. Each of the ribs 155 is generally channel-shaped in transverse cross section, including an outer wall 156 spaced outwardly from the planes of the portions 152-154 by side walls 157 which are respectively integral with the front and rear edges of the outer wall 156. If desired, dimples (or ribs) similar to the dimples 97a may be provided on the ribs 155 and for the same purpose. Thus, it will be appreciated that the outer walls 156 define lands spaced outwardly from the main planes of the portions 152-154, with the inner surfaces of the ribs 155 defining valleys or channels in the inner surfaces of the portions 152-154. The loop frame member 151 is provided at its front and rear edges with outwardly extending end flanges 158 extending around the entire perimeter thereof. Each of the side portions 152 is provided with a plurality of spaced-apart openings 159 therein which may be of different shapes, and are preferably arranged in rows parallel to and spaced apart by the ribs 155. Preferably, the loop frame member 151 is of unitary, one-piece construction.

In assembly, the panel sections 142-146 of the housing 140 are fitted around the outside of the loop frame member 151, and are fixedly secured to the outer walls 156 of the ribs 155, preferably by a suitable adhesive, as at 160 (FIG. 15).

From the foregoing, it can be seen that there has been provided an improved tool cabinet construction and a method and an apparatus for assembling same which are characterized by ease, speed and simplicity of operation and result in a cabinet housing construction which is strong, rigid and devoid of welds and fasteners.

We claim:

1. A cabinet structure comprising: a plurality of panel sections, first means associating said panel sections in a predetermined arrangement to form a housing, a continuous loop frame member disposed internally of said housing, said loop frame member being of unitary one-piece construction and including top and bottom portions and opposed side portion, and second means independent of said first means fixedly securing each of said portions of said loop frame member to said housing.

2. The cabinet structure of claim 1, wherein said second means includes adhesive means.

3. The cabinet structure of claim 2, wherein said adhesive means is the sole means of attachment of said loop frame member to said housing.

4. The cabinet structure of claim 1, wherein said panel sections include a back panel section unitary with said side panel sections.

5. The cabinet structure of claim 1, wherein said loop frame member includes a plurality of alternating lands and channels extending around the perimeter thereof.

6. The cabinet structure of claim and further comprising a plurality of said continuous loop frame members spaced apart within said housing, each of said loop frame members being fixedly secured to said housing.

7. The cabinet structure of claim 6, wherein each of said loop frame members has a generally hat-shaped transverse cross-section which defines a channel with a pair of laterally outwardly extending attachment flanges, said means fixedly securing including means securing said attachment flanges to said housing.

8. The cabinet structure of claim 7, and further comprising stop means projecting outwardly from each of said attachment flanges for engagement with said housing to establish a minimum spacing between said attachment flanges and said housing.

9. The cabinet structure of claim 6, wherein each of said loop frame members is of one-piece construction.

10. The cabinet structure of claim 1, wherein said first means includes attachment flanges on each of said panel sections adapted to be interfitted with the attachment flanges of adjacent panel sections.

11. The cabinet structure of claim 10, and further comprising adhesive means securing together the interfitted attachment flanges of adjacent panel sections.

12. A tool cabinet comprising: a plurality of panel sections, first means associating said panel sections in a predetermined arrangement to form a box-like housing having an opening therein, a continuous loop frame member disposed internally of said housing and encompassing said opening, said loop frame member being of unitary one-piece construction and including top and bottom portions and opposed side portion, second means independent of said first means fixedly securing each of said portions of said loop frame member to said housing, and a plurality of drawer assemblies disposed in said opening and mounted on said loop frame member.

13. The cabinet structure of claim 12, wherein said second means includes adhesive means.

14. The cabinet structure of claim 12, and further comprising a plurality of said continuous loop frame members spaced apart within said housing, each of said loop frame members being fixedly secured to said housing.

15. The tool cabinet of claim 14, wherein each of said loop frame members has a plurality of apertures therein spaced apart longitudinally thereof to facilitate mounting of said drawing assemblies thereon.

16. The tool cabinet of claim 12, and further comprising lock bar mechanism, and adhesive means fixedly securing said lock bar mechanism to the inside of one of said panel sections.

17. The tool cabinet of claim 16, wherein said one panel section has flange means at opposite ends thereof, said lock bar means including recesses at the opposite ends thereof for respectively receiving said flange means in snap-fitting engagement.

18. The cabinet structure of claim 12, wherein said loop frame member includes a plurality of alternating lands and channels extending around the perimeter thereof.

19. A method of forming a cabinet structure comprising the steps of: providing a continuous unitary loop frame member including top and bottom portions and opposed side portions and a plurality of panel sections, providing a first assemblage of the panel sections in a predetermined arrangement to form a housing, and fixedly securing the housing to the outside of each of the portions of the loop frame member independently of the first assemblage.

20. The method of claim 19, wherein the housing is adhesively secured to the outside of the loop frame member.

21. The method of claim 19, wherein a plurality of said loop frame members are provided at spaced-apart locations, the housing being adhesively secured to all of the loop frame members.

22. The method of claim 19, and further comprising the step of providing attachment flanges on the panel sections and interfitting the attachment flanges of adjacent panel sections to form the housing.

23. The method of claim 22, and further comprising the step of adhesively securing together the attachment flanges of adjacent panel sections.

24. The method of claim 19, and further comprising the steps of providing a lock bar guide, adhesively securing the lock bar guide to the inside of one of the panel sections, providing an aperture in one of the panel sections, providing a lock bar member, and inserting the lock bar member through the aperture and into engagement with the lock bar guide after the lock bar guide and the loop frame member have been secured to the housing.

* * * * *